United States Patent
Xu

(10) Patent No.: US 9,617,374 B2
(45) Date of Patent: Apr. 11, 2017

(54) HIGH-MOLECULAR LIQUID CRYSTAL MATERIAL FOR FRAME OF LIQUID CRYSTAL DISPLAY, FRAME AND MANUFACTURING METHOD

(71) Applicant: SHENZHEN CHINA STAR OPTOELECTRONICS TECHNOLOGY CO., LTD., Shenzhen, Guangdong (CN)

(72) Inventor: Liang Xu, Guangdong (CN)

(73) Assignee: SHENZHEN CHINA STAR OPTOELECTRONICS TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 14/111,786

(22) PCT Filed: Jun. 30, 2013

(86) PCT No.: PCT/CN2013/078539
§ 371 (c)(1),
(2) Date: Oct. 15, 2013

(87) PCT Pub. No.: WO2014/201727
PCT Pub. Date: Dec. 24, 2014

(65) Prior Publication Data
US 2016/0115273 A1 Apr. 28, 2016

(30) Foreign Application Priority Data
Jun. 20, 2013 (CN) .......................... 2013 1 0248154

(51) Int. Cl.
| | | |
|---|---|---|
| *C09K 19/30* | (2006.01) | |
| *C08G 63/00* | (2006.01) | |
| *C09K 19/38* | (2006.01) | |
| *C08G 63/54* | (2006.01) | |

(52) U.S. Cl.
CPC ............. *C08G 63/00* (2013.01); *C08G 63/54* (2013.01); *C09K 19/3809* (2013.01)

(58) Field of Classification Search
CPC .................................................. G03F 1/1334
See application file for complete search history.

(56) References Cited

U.S. PATENT DOCUMENTS

| | | |
|---|---|---|
| 5,271,866 A | 12/1993 | Uchida et al. |
| 6,339,114 B1 | 1/2002 | Klee et al. |
| 2008/0280073 A1 | 11/2008 | Yamamoto |
| 2010/0163796 A1* | 7/2010 | Fukuhara ........... C09K 19/3809 252/299.61 |
| 2012/0231217 A1* | 9/2012 | Sasada ..................... G02B 1/04 428/141 |
| 2012/0241664 A1 | 9/2012 | Brill et al. |

FOREIGN PATENT DOCUMENTS

| | | |
|---|---|---|
| CN | 101016246 A | 8/2007 |
| CN | 101193752 A | 6/2008 |
| CN | 101294002 A | 10/2008 |
| CN | 101472414 A | 7/2009 |
| CN | 101896533 A | 11/2010 |
| CN | 102153738 A | 8/2011 |
| CN | 102445787 A | 5/2012 |
| JP | 2002194169 A * | 7/2002 |

OTHER PUBLICATIONS

Huo YanLi, the International Searching Authority written comments, Mar. 2014, CN.

\* cited by examiner

*Primary Examiner* — Chanceity Robinson

(57) ABSTRACT

The invention provides a high-molecular liquid crystal material for a frame of a Liquid Crystal Display (LCD), which is prepared by cross-linking and polymerizing a group which includes terephthalic acid and an alcohol which includes carbon-carbon double bonds, wherein, the group which includes terephthalic acid is any one of terephthalic acid, ortho-alkyl-terephthalic acid or meta-alkyl-terephthalic acid; the alcohol which includes carbon-carbon double bonds is any one of vinyl alcohol, vinyl alcohol with alkyl, or conjugated vinyl alcohol. The high-molecular liquid crystal material improves the steric hindrance among the molecules, and prevents from reacting with the liquid crystal small molecules to form a coordination complex; the high-molecular liquid crystal material has high stability, and cannot form a solid state under a certain molecular weight, thus improving the flexibility and being beneficial for the coating process.

9 Claims, No Drawings

HIGH-MOLECULAR LIQUID CRYSTAL MATERIAL FOR FRAME OF LIQUID CRYSTAL DISPLAY, FRAME AND MANUFACTURING METHOD

FIELD OF THE INVENTION

The invention relates to a liquid crystal device, and in particular to a high-molecular liquid crystal material for a frame of a Liquid Crystal Display (LCD), and a frame of the display and a manufacturing method.

BACKGROUND OF THE INVENTION

With the development of the information society, people have a growing demand on the display devices; in order to satisfy the requirements, a plurality of flat panel display devices such as an LCD, a Plasma Display Panel (PDP) and an Organic Light Emitting Diode (OLED) have been rapidly developed recently. In the flat panel display devices, the LCD has basically replaced the cold-cathode display device due to the advantages of light weight, small size and low energy consumption.

However, the Thin Film Transistor LCD (TFT-LCD) itself is beginning to receive new challenges of the display technology, for example, the TFT-LCD itself has some inherent disadvantages; with the development of technology, the disadvantages are increasingly challenged, and are increasingly unable to be accepted by the consumers and technology trends. Relative to the OLED, the TFT-LCD mainly ahs the following problems:

1) passive lighting, so, no matter it is a black screen or a white screen, the backlight needs to be turned on all the time, which causes high energy consumption; in the TFT-LCD, the liquid crystal is only used as a light valve to control the penetration and blockage of the light, and the liquid crystal itself cannot light, thus, the backlight must be turned on no matter it is a black screen or a white screen; although a Local Dimming technology is put forwarded in the TFT-LCD, the algorithm is complicated, and is unable to adapt to most of the display pictures, some Local Dimming which is unequally displayed is easy to occur; and even if used, the backlight cannot be truly turned off, and a certain energy consumption also exists.

2) lower aperture ratio, which further reduces the utilization rate of energy; the rapid development of the TFT-LCD is more based on an amorphous silicon platform (certainly, a small part of the products also use polycrystalline silicon), which has cheap price, simple technology and better uniformity; so, there are 55 inches, 65 inches and other larger size of products at present; the larger the size is, the higher the impedance of the line is; the metal wirings which are more coarse and thicker, and have better electric conductivity are required; the thickness cannot be increased infinitely, the materials with best electric conductivity are metal silver and copper, the better practical conductive materials may not be expected to have a breakthrough within a long time, only the width of the line can be increased, thus further reducing the aperture ratio of the TFT-LCD.

3) narrower acceptable environment temperature, mainly because the liquid crystal state only can exist in a very narrow temperature range; generally, the liquid crystal phase material used for the TFT-LCD only can exist under −20-70 degrees centigrade; in some special occasions, the liquid crystal materials under −30-100 degrees centigrade also can be used, but this is basically close to the limit; in some special occasions, such as the South and North poles, the aerospace and the higher-temperature environments, the liquid crystal is not quite good.

4) low response speed; as the TFT-LCD cannot automatically give out light, but to control the penetration and blockage of the light by taking the liquid crystal as the light valve, the response speed of the liquid crystal is very important; however, as the liquid crystal itself has higher viscosity, especially the negative liquid crystal used for vertical alignment, the response speed only can achieve the millisecond level, and is not a match on the microsecond speed of the OLED.

5) larger frame: because of using the alignment film and liquid crystal, the frame needs to be sealed by the frame material, and also needs backlight; the frame of the TFT-LCD cannot be smaller, and the minimum frame capable of being mass produced is approximately 4 mm.

At present, most of the frame materials of the LCD are the mixture of poly-epoxy resin, cellulose, diatomite, ultraviolet initiator and ultraviolet terminating agent, wherein the poly-epoxy resin, the ultraviolet initiator and the like may pollute the liquid crystal. As the oxygen of the epoxy resin has P orbital electron pairs and smaller steric hindrance, it may form the coordination compound with the benzene ring in the liquid crystal molecules, thus changing the state of the liquid crystal phase, causing uneven display brightness, and causing the phenomenon of various traces. In order to reduce the traces, the frame material is expected to achieve a certain polymerization degree before contacting the liquid crystal in the display area; and in order to achieve this purpose, a certain distance between the liquid crystal and the frame material must be guaranteed, and even so, there is some pollution in the near areas.

The disadvantages are almost the advantages of the OLED, but the TFT-LCD has more mature production technology, more mature and stable supply chains, and more competitive cost advantages than the PLED; therefore, the TFT-LCD is also the main stream of the display technology for a long time in the future; aiming at the above disadvantages, a certain discussion and improvement on the material technology are expected; the new high-molecular liquid crystal material is adopted as the frame material; as the high-molecular liquid crystal material itself is a liquid crystal, it can reduce the pollution to the small-molecular liquid crystal in the panel, thus achieving the purpose of reducing the frame of the LCD.

SUMMARY OF THE INVENTION

In order to achieve the above purpose, the invention provides a high-molecular liquid crystal material for the LCD frame, which is prepared by cross-linking and polymerizing a group which includes terephthalic acid and an alcohol which includes carbon-carbon double bonds, wherein, the group which includes terephthalic acid is any one of terephthalic acid, ortho-alkyl-terephthalic acid or meta-alkyl-terephthalic acid; the alcohol which includes carbon-carbon double bonds is any one of vinyl alcohol, vinyl alcohol with alkyl, or conjugated vinyl alcohol.

Preferably, the group which includes terephthalic acid is terephthalic acid, the alcohol which includes carbon-carbon double bonds is vinyl alcohol; the high-molecular liquid crystal material is prepared by cross-linking and polymerizing the terephthalic acid and the vinyl alcohol; the molecular formula of the polymer is:

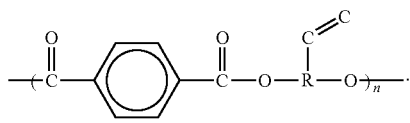

Preferably, the group which includes terephthalic acid is terephthalic acid, the alcohol which includes carbon-carbon double bonds is vinyl alcohol with alkyl; the high-molecular liquid crystal material is prepared by cross-linking and polymerizing the terephthalic acid and the vinyl alcohol with alkyl; a branched-chain alkyl is added on an alkyl chain; the molecular formula of the polymer is:

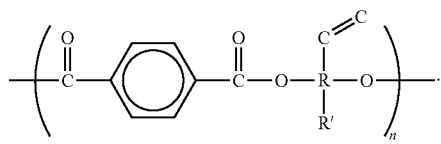

Preferably, the group which includes terephthalic acid is ortho-alkyl-terephthalic acid, the alcohol which includes carbon-carbon double bonds is vinyl alcohol; the high-molecular liquid crystal material is prepared by cross-linking and polymerizing the ortho-alkyl-terephthalic acid and the vinyl alcohol; a branched-chain alkyl is added on a benzene ring, the molecular formula of the polymer is:

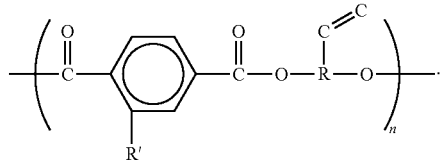

Preferably, the group which includes terephthalic acid is ortho-alkyl-terephthalic acid, the alcohol which includes carbon-carbon double bonds is conjugated vinyl alcohol; the high-molecular liquid crystal material is prepared by cross-linking and polymerizing the ortho-alkyl-terephthalic acid and the conjugated vinyl alcohol; the carbon-carbon conjugated double bonds are added on the alkyl chain, the branched-chain alkyl is added on the benzene ring, the molecular formula of the polymer is:

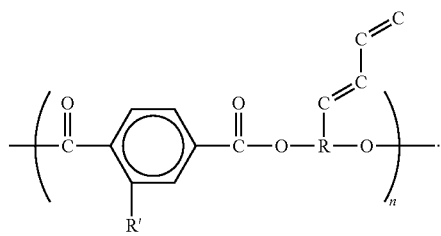

In the invention, R is a linear-chain alkyl, and 1-3 carbons are on the linear chain; R and R' are —$CH_3$ or —$CH_2$—$CH_3$, the polymerization degree n value is 50-1000.

The invention also provides an LCD frame adopting the high-molecular liquid crystal material, wherein the high-molecular liquid crystal material is prepared by cross-linking and polymerizing a group which includes terephthalic acid and an alcohol which includes carbon-carbon double bonds; wherein, the polymerization degree n value is 50-1000, preferably, the polymerization degree n value is 500-600; the auxiliary material is one or more of cellulose, glass fiber, diatomite and ultraviolet initiator.

The invention also provides a method for manufacturing the LCD frame, including the following steps:

Step 1) proportioning the group which includes terephthalic acid and the alcohol which includes carbon-carbon double bonds according to a molar ratio of 1:1 to obtain the polymer, wherein the reaction temperature is 60-100 degrees centigrade;

Step 2) cooling the obtained polymer to be 35-40 degrees centigrade, preventing the residual reactants of the reaction from continuously reacting, thus causing increased molecular weight;

Step 3) vacuum drying to remove the non-reacted alcohol, wherein the vacuum degree is −0.1 atmosphere;

Step 4) via preliminary filtering, separating the small molecular substances and the polymers with required polymerization degree by putting the polymer into a centrifuge, so as to obtain the required polymer which is capable of manufacturing the LCD frame.

Compared with the conventional art, the invention provides a high-molecular liquid crystal material prepared by cross-linking and polymerizing a group which includes terephthalic acid and an alcohol which includes carbon-carbon double bonds as the LCD frame material, replaces the original poly-epoxy resin, improves the steric hindrance among the molecules, and prevents from reacting with the liquid crystal small molecules to form the coordination compound, thus, it has higher stability, and cannot form a solid state in a certain molecular weight, the flexibility is improved, thus being beneficial for the coating technology; in addition, by adding the alkyl on the benzene ring or the branched-chain alkyl, the melting point of the polymer can be reduced, the glass transition temperature can be reduced, the weather resistance can be improved, and a certain physical and chemical stability under the severe temperature changes can be maintained. Because the compositions of the frame material and the liquid crystal molecules are similar, the pollution cannot be caused, therefore, the size of the LCD frame can be reduced.

DETAILED DESCRIPTION OF THE PREFERRED EMBODIMENTS

In order to replace the original poly-epoxy resin material, the invention provides a high-molecular liquid crystal material for preparing the LCD frame material; the high-molecular liquid crystal material is prepared by cross-linking and polymerizing a group which includes terephthalic acid and an alcohol which includes carbon-carbon double bonds, wherein, the group which includes terephthalic acid is any one of terephthalic acid, ortho-alkyl-terephthalic acid or meta-alkyl-terephthalic acid; the alcohol which includes carbon-carbon double bonds is any one of vinyl alcohol, vinyl alcohol with alkyl, or conjugated vinyl alcohol. The high-molecular liquid crystal material is capable of reducing the pollution of the frame to the liquid crystal, enlarging the acceptable environment temperature range, and enlarging the width of the frame.

Embodiment 1

This embodiment provides a high-molecular liquid crystal material for the LCD frame, which is prepared by cross-linking and polymerizing the terephthalic acid and the vinyl alcohol, the molecular formula of the polymer is:

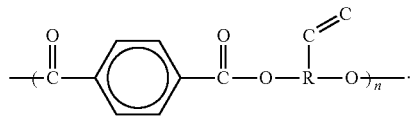

Preferably, the terephthalic acid

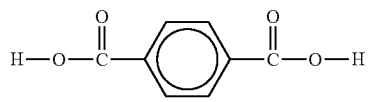

and corresponding alcohol

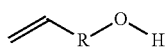

are adopted to implement a poly-condensation reaction, the polymer with required molecular weight is obtained by controlling the polymerization degree, and the carbon-carbon double bonds are added on the alkyl chain of the original polymer.

The carbon-carbon double bonds added on the alkyl can increase the steric hindrance among the molecules during the polymerization reaction, such that the solid state cannot be formed under a certain molecular weight, the flexibility can be increased, thus being beneficial for bonding use. Meanwhile, due to the existence of double bonds, the frame encapsulation adhesive which satisfies the requirements of strength and coating property can be formed by cross-linking and polymerizing the double bonds via subsequent ultraviolet light irradiation mode and heating mode.

The auxiliary part can adopt the cellulose, the glass fiber, the diatomite and the like, and also can add a balanced amount of ultraviolet initiator as required.

Embodiment 2

This embodiment provides a high-molecular liquid crystal material for the LCD frame, which is prepared by cross-linking and polymerizing the terephthalic acid and the vinyl alcohol with alkyl, the molecular formula of the polymer is:

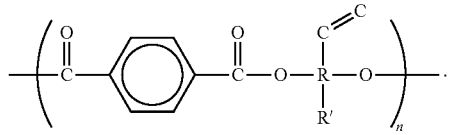

Preferably, the terephthalic acid

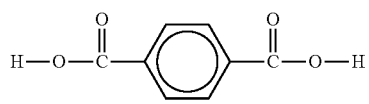

and corresponding alcohol

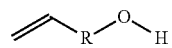

are adopted to implement a poly-condensation reaction, the polymer with required molecular weight is obtained by controlling the polymerization degree, the carbon-carbon double bonds and branched-chain alkyl are added on the alkyl chain of the original polymer, the electron cloud is increased, the conjugation degree is increased, the rigidity of the primary bond of the alkyl is increased, the stretching molar quantity is improved, so as to improve the brittleness of the polymerization degree; meanwhile, the effect of the branched-chain alkyl is capable of further reducing the melting point of the polymer, and is convenient for coating.

The auxiliary part can adopt the cellulose, the glass fiber, the diatomite and the like, and also can add a balanced amount of ultraviolet initiator as required.

Embodiment 3

This embodiment provides a high-molecular liquid crystal material for the LCD frame, which is prepared by cross-linking and polymerizing the alkyl-terephthalic acid and the vinyl alcohol, the molecular formula of the polymer is:

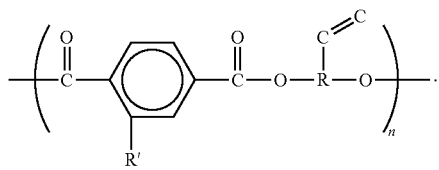

Preferably, the ortho-terephthalic acid

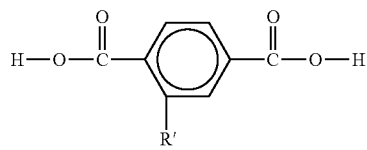

and corresponding alcohol

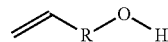

are adopted to implement the poly-condensation reaction, the polymer with required molecular weight is obtained by controlling the polymerization degree, and the carbon-carbon double bonds are added on the alkyl chain of the original polymer; meanwhile, a branched-chain alkyl is added on the benzene ring to reduce the glass transition temperature of the polymer, and to improve the weather resistance, thus it can better adapt to changes of the ambient temperature; the effect of the branched-chain alkyl is capable of further reducing the melting point of the polymer, and is convenient for coating, without causing hard polymerization reaction to the carbon-carbon double bonds.

The auxiliary part can adopt the cellulose, the glass fiber, the diatomite and the like, and also can add a balanced amount of ultraviolet initiator as required.

Embodiment 4

This embodiment provides a high-molecular liquid crystal material for the LCD frame, which is prepared by cross-linking and polymerizing the alkyl-terephthalic acid and the conjugated vinyl alcohol, the molecular formula of the polymer is:

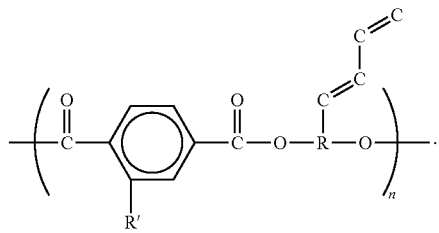

Preferably, the ortho-terephthalic acid

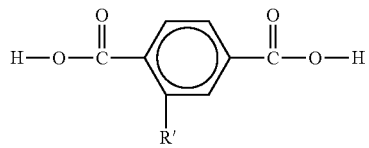

and the conjugated vinyl alcohol C=C—C=C—R—OH are adopted to implement the poly-condensation reaction, the polymer with required molecular weight is obtained by controlling the polymerization degree, and the carbon-carbon double bonds are added on the alkyl chain of the original polymer; meanwhile, a branched-chain alkyl is added on the benzene ring; the effect of the branched-chain alkyl is capable of further reducing the melting point of the polymer, and is convenient for coating; the reaction activation energy of the carbon-carbon conjugated double bonds is obviously lower than the carbon-carbon double bonds, and is convenient for exciting the reaction.

The auxiliary part can adopt the cellulose, the glass fiber, the diatomite and the like, and also can add a balanced amount of ultraviolet initiator as required.

Wherein, R and R' are linear-chain alkyls, there are 1-3 carbons on the linear chain. Preferably, R and R' are —CH3 or —CH2-CH3. The polymerization degree n value of the high-molecular liquid crystal material polymer is 50-1000, and preferably, the polymerization degree n value is 500-600. The polymerization degree is adjusted by adjusting the reaction time, the reaction temperature, the selection and dosage of the catalyst, and the like, so as to obtain the polymerization products with different molecular weights.

In the invention, the modification reaction is implemented on the benzene ring and the alkyl of the original polymer, if the carbon-carbon double bonds are added on the alkyl, the steric hindrance among the molecules is increased by adding the double bonds, such that the solid state cannot be formed when polymerizing to the molecular weight, the viscosity of the polymer is increased; if a branched-chain alkyl is further added on the alkyl chain, it can further reduce the melting point of the polymer, and is convenient for the coating process; if a branched-chain alkyl is further added on the benzene ring, the melting point of the polymer can be reduced, and it is easy to implement polymerization with the carbon-carbon double bonds; if the carbon-carbon conjugated double bonds are added on the alkyl chain, the reaction activation energy of the polymer can be reduced, thus being convenient for exciting the reaction. By implementing polymerization with different monomers, improving the viscosity and weather resistance of the high-molecular liquid crystal material via the carbon-carbon double bonds, the liquid crystal material cannot form the solid state under a certain molecular weight, and meanwhile, due to the existence of the carbon-carbon double bonds, the frame material which satisfies the requirements of strength and coating property can be formed by cross-linking and polymerizing the carbon-carbon double bonds via the subsequent ultraviolet light radiation mode and heating mode.

The invention also provides a method for manufacturing the LCD frame, including the following steps:

Step 1) proportioning the terephthalic acid and alcohol

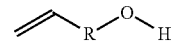

according to the molar ratio of 1:1 to obtain the polymer

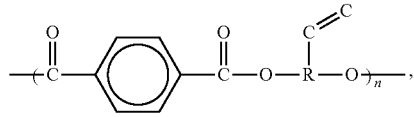

wherein the reaction temperature is 60-100 degrees centigrade, and preferably 80 degrees centigrade;

Step 2) rapidly cooling the obtained polymer to be 35-40 degrees centigrade via circulating water cooling mode, preferably 38 degrees centigrade, preventing the residual reactants of the reaction from continuously reacting, controlling the increase of the molecular weight, and controlling the polymerization degree of the polymer;

Step 3) vacuum drying to remove the non-reacted alcohol, wherein the vacuum degree is −0.1 atmosphere, so as to control the reaction speed not to be too severe; if the reaction speed is too severe, the uniformity of the molecular weight may be reduced; generally, the vacuum degree is not high, and is slightly lower than the atmosphere;

Step 4) via preliminary filtering, separating the small molecular substances and the polymers with required polymerization degree by putting the polymer into a centrifuge, so as to obtain the required polymer which is capable of manufacturing the LCD frame.

Different high-molecular liquid crystal materials can be polymerized by changing the monomers, and can be modified to obtain the polymer material suitable for manufacturing the high-molecular liquid crystal frame; the polymer material replaces the existing poly-epoxy resin, the physical and chemical performance thereof is more similar with the liquid crystal molecules, and the polymer itself is a liquid crystal material, so it can reduce the pollution to the small-molecular liquid crystal encapsulated therein, thus reducing the size of the frame material.

What is claimed is:

1. A high-molecular liquid crystal material for a frame of LCD, wherein the high-molecular liquid crystal material is prepared by cross-linking and polymerizing a group which includes terephthalic acid and an alcohol which includes carbon-carbon double bonds; the group which includes terephthalic acid is terephthalic acid, the alcohol Which includes carbon-carbon double bonds is vinyl alcohol; a polymer is prepared by cross-linking and polymerizing the terephthalic acid and the vinyl alcohol; a branched-chain alkyl is added on an alkyl chain; the molecular formula of the polymer is:

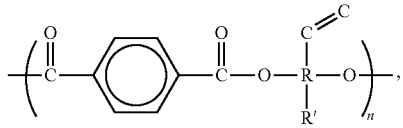

wherein R and R' are linear-chain alkyl and n is 50-1000.

2. The high-molecular liquid crystal material for a frame of LCD according to claim 1, wherein, the group which includes terephthalic acid is ortho-alkyl-terephthalic acid, the alcohol which includes carbon-carbon double bonds is vinyl alcohol; a polymer is prepared by cross-linking and polymerizing ortho-alkyl-terephthalic acid and vinyl alcohol; a branched-chain alkyl is added on a benzene ring, the molecular formula of the polymer is:

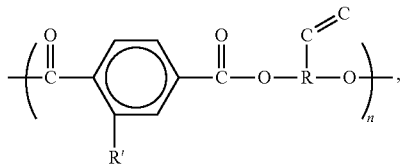

wherein R and R' are linear-chain alkyl and n is 50-1000.

3. The high-molecular liquid crystal material for a frame of LCD according to claim 1, wherein, the group which includes terephthalic acid is ortho-alkyl-terephthalic acid, the alcohol which includes carbon-carbon double bonds is conjugated vinyl alcohol; a polymer is prepared by cross-linking and polymerizing the ortho-alkyl-terephthalic acid and the conjugated vinyl alcohol; the carbon-carbon conjugated double bonds are added on the alkyl chain, the branched-chain alkyl is added on the benzene ring, the molecular formula of the polymer is:

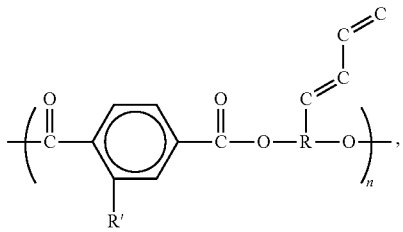

wherein R and R' are linear-chain alkyl and n is 50-1000.

4. The high-molecular liquid crystal material for a frame of LCD according to claim 1, wherein 1-3 carbons are on the linear chain.

5. The high-molecular liquid crystal material for a frame of LCD according to claim 4, wherein R is —$CH_3$ or —$CH_2$—$CH_3$.

6. The high-molecular liquid crystal material for a frame of LCD according to claim 1, Wherein 1-3 carbons are on the linear chain.

7. The high-molecular liquid crystal material for a frame of LCD according to claim 2, wherein 1-3 carbons are on the linear chain.

8. The high-molecular liquid crystal material for a frame of LCD according to claim 3, wherein 1-3 carbons are on the linear chain.

9. The high-molecular liquid crystal material for a frame of LCD according to claim 1, wherein the polymerization degree n value of the polymer is 500-600.

\* \* \* \* \*